United States Patent
Preta et al.

(10) Patent No.: US 8,011,593 B2
(45) Date of Patent: Sep. 6, 2011

(54) SMART APPARATUS FOR MAKING SECURE TRANSACTIONS

(76) Inventors: Joseph Frank Preta, Tampa, FL (US); William Monty Simmons, Lenoir, NC (US); Dominic Joseph Preta, Tampa, FL (US); Isaiah Monty Simmons, Lenoir, NC (US)

( * ) Notice: Subject to any disclaimer, the term of this patent is extended or adjusted under 35 U.S.C. 154(b) by 714 days.

(21) Appl. No.: 12/050,141

(22) Filed: Mar. 17, 2008

(65) Prior Publication Data
US 2008/0223937 A1 Sep. 18, 2008

Related U.S. Application Data

(60) Provisional application No. 60/895,008, filed on Mar. 15, 2007.

(51) Int. Cl.
*G06K 19/06* (2006.01)
(52) U.S. Cl. .................................... 235/492; 235/380
(58) Field of Classification Search .................. 235/492, 235/380, 451
See application file for complete search history.

(56) References Cited

U.S. PATENT DOCUMENTS

| | | | |
|---|---|---|---|
| 4,720,860 A | 1/1988 | Weiss | |
| 4,856,062 A | 10/1989 | Weiss | |
| 4,885,778 A | 12/1989 | Weiss | |
| 5,680,460 A | 10/1997 | Tomko et al. | |
| 5,712,912 A | 1/1998 | Tomko et al. | |
| 5,909,501 A | 6/1999 | Thebaud | |
| 6,325,285 B1* | 12/2001 | Baratelli | 235/380 |
| 6,353,889 B1 | 3/2002 | Hollingshead | |
| 6,356,649 B2 | 3/2002 | Harkless et al. | |
| 6,681,995 B2 | 1/2004 | Sukeda et al. | |
| 7,341,181 B2 | 3/2008 | Bonalle et al. | |
| 2003/0220841 A1 | 11/2003 | Maritzen | |
| 2004/0124968 A1* | 7/2004 | Inada et al. | 340/5.72 |
| 2006/0027905 A1 | 2/2006 | Bauer et al. | |
| 2008/0110983 A1* | 5/2008 | Ashfield | 235/382 |

OTHER PUBLICATIONS

A. Abrial, J. Bouvier, M. Renaudin, P. Vivet, A Contactless Smart-Card Chip Based on an Asynchronous 8-bit Microcontroller, 24 pages.
CYPRESS, "MoBL : The New Mobile SRAM" 1999, 4 pages.
LTG Steven W. Boutelle, "Department of Defense Biometrics", Mar. 2004, 4 Pages.
SONY, "Felica", Sep. 2005, 3 pages.
Won J. Jun, "Smart Card Technology Capabilities", Jul. 8, 2003, 30 Pages.
SONY, "Contactless IC Module for Watch", Sep. 2005, 1 Page.
Lattice, "ispMACH 4000Z CPLDs in PDAs, Personal Media Players and Smart Phones", White Paper, May 2004, 16 pages.
Charles Cagliostro, "Smart Cards Primer", www.smartcardalliance.org, 4 Pages.
Smart Card Forum, "What is so smart about Smart Cards," 12 Pages.
Texas Instruments, "System Block Diagram" 1 Page.
SUPREMA, "UniFinger SFM3050-TC Datasheet" Ver. 1.0, 2004, 11 Pages.

* cited by examiner

*Primary Examiner* — Ahshik Kim
(74) *Attorney, Agent, or Firm* — Monty Simmons; Simmons Patents (57) ABSTRACT

The disclosed invention relates to an apparatus and method for making secured transactions. Such an apparatus may include a smart card device configured with a display for display a static or dynamic number for making a secured transaction. The display is configured to display a valid card number after the user's identify has been verified using a biometric verification process. The device may further comprise a programmable magnetic strip that is programmed with user data after the user's identify has been verified. The apparatus may further include a cloning process to allow a second device to perform secure transactions. One such second device is a smart module associated with a vehicle.

20 Claims, 7 Drawing Sheets

SMART APPARATUS FOR MAKING SECURE TRANSACTIONS

CLAIM TO PRIORITY

This application claims priority to provisional application 60/895,008 filed on Mar. 15, 2007, the entire contents of which are incorporated herein by this reference for all purposes.

TECHNICAL FIELD OF THE INVENTION

The present invention relates to a smart apparatus for making secure transactions including financial transactions, accessing restricted vehicles and accessing restricted areas.

BACKGROUND OF THE INVENTION

Unscrupulous people engaging in fraudulent transactions and exploiting businesses for their own financial gain is an often lamented yet common topic of commerce lore. While the fundamental nature of most fraudulent schemes has changed little over time, such schemes have adapted to take advantage of technological advances. For example, with the advent of the Internet, scams that were once limited to a specific geographic area can now be implemented on a global scale. Indeed, the same technological advances that have been a godsend to the banking industry have also become a powerful tool for criminals. As a result, online stores are said to experience fraud 17 times more often than traditional retail stores.

Similarly, credit cards have greatly improved the convenience of shopping in both traditional retail stores and online stores. Unfortunately, credit-card fraud has become increasingly common. None of the credit-card associations disclose exact loss-rate figures for credit card fraud; however, it is believed that credit card fraud losses amount to about $1.5 billion a year. Unfortunately, it appears that credit-card companies have yet to come to grips with the full scope of the problem. While credit card companies claim to have a handle on the problem, when fraud happens, everyone points fingers at everyone else (processors, banks, credit card issuer, and the merchants). In addition, law enforcement and government agencies tend to only investigate big cases. In the end, no one takes the blame for credit card fraud and such costs are simply passed on to consumers.

Most credit card crime involves cards lost by or stolen from cardholders. Unethical retail store clerks and restaurant employees, for example, may steal card numbers when a customer pays for services with a credit card. Alternatively, a scam artist can go through the trash of any merchant or customer garbage, get valid credit card numbers, and use them on the Internet. Sometimes crooks are able to listen while you dictate your account number over a public phone and copy it down for later use. Some crooks even monitor cellular and cordless phone conversations, hoping to overhear a credit card transaction.

While it may be true that credit card fraud is something that cannot be completely eliminated, credit card fraud can clearly be managed. Merchants must develop a balance between using safeguards to prevent fraud while not creating too many hoops for customers to jump through. One notable common attribute of almost all fraudulent transactions using a credit card relates to the credit card number. The credit card number on most prior art credit cards is a static number. However, one prior art device that may be used as a credit card while generating a dynamic card number is disclosed in U.S. Pat. Nos. 4,856,062 and 4,885,778, issued to Weiss, and such patents are incorporated by this reference for all purposes. While the Weiss devices do offer improved security over prior art devices, they still have their weaknesses. For example, if a user losses a "Weiss" type device, they can still use the card. What is needed is a device that can generates a dynamic card number but does not display the number until the card holder's (a user) identify is verified.

Other attempts to prevent credit card fraud include the development of smartcards. The term "smartcard" refers generally to wallet-sized cards incorporating a processor or micro-controller to store and manage data within the card. One advantage of smartcards is leveraged through the use of sophisticated memory management and security features. One such smartcard invention is disclosed in U.S. patent Bonalle et al. U.S. Pat. No. 7,341,181 which is incorporated by this reference for all that it discloses. While Bonalle discloses many security features that improve the security of financial transactions, addition protections are needed. For example, what is needed is a credit card that has a static or dynamic number that is only displayed after a user has been verified as an authorized user. In addition, the card should also provide a visual and/or audio signal indication the result of a user verification process.

Additionally, there is a need for such an improved device to be incorporated in an electronic device already carried or used by a card holder. For example, what is needed is a "smartcard" that can clone its authorization process to information and/or processes to an external digital device such as a cell phone, personal digital assistant (PDA), or other such devices.

In addition to credit card fraud, criminals often steal "manually" by entering an unauthorized area or taking an item (e.g. vehicle, money, documents, etc.). What is needed is an apparatus that can be used to make secure transactions, enter restricted access areas, and activated restricted items (such as vehicles).

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a smart transaction device (STD) that generates a dynamic number that is valid for a predefined period of time. The STD may generate such dynamic number upon user command, periodically at set intervals, periodically at varying intervals, and/or periodically at random intervals.

Another general object of the present invention is to provide a smart transaction card that comprises an on card biosensor that is used to take a real time bio-sample for a desired user and use such real time bio-sample to verify the desired user of a card is an authorized user. After user verification, an on card display device displays a card number.

Another general object of the present invention is to provide a smart card with a receiver for receiving user identification data form an external source where the user identification data is used to verify a desired card user is an authorized card user. After user identity verification, the card generates a dynamic card number that is valid for a predefined period of time.

Another general object of the present invention is to provide a smart card with a transmitter for transmitting user and card information to an external system where the user and card information includes a time stamp and a dynamic card number generated by the card.

Yet another general object of the present invention is to provide a smart card with an alert mechanism that provides a visual and/or audible feedback signal based on the results of the user verification check.

A still further object of the present invention is to provide a communication device normally associated with a user where the communication device comprises a biosensor that is used to take a real time bio-sample of a desired user. The communication device provides a plurality of services to an authorized user. The communication device may be configured to store enrolment bio-samples for a plurality of authorized users. The real time bio-sample is compared to a stored bio-sample. Next the communication device determines if the two bio-samples match, and if so, the desired user is granted access to at least one of the plurality of services provide by the communication devices.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Additional objectives and embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "associated" by bringing them together or into relationship with each other in any number of ways including a direct or indirect physical connection. Similarly, two or more items are "electrically associated" by bringing them together or into relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest.

It will be appreciated that while this document contains headers, such headers are place markers only and are not intended to form a part of this document or affect its construction.

While the particulars of the present invention and associated technology may be adapted for use with any application where user identification is required before granting access or approving an activity, the examples discussed herein are primarily in the context of devices for making financial transactions.

Figure 1:
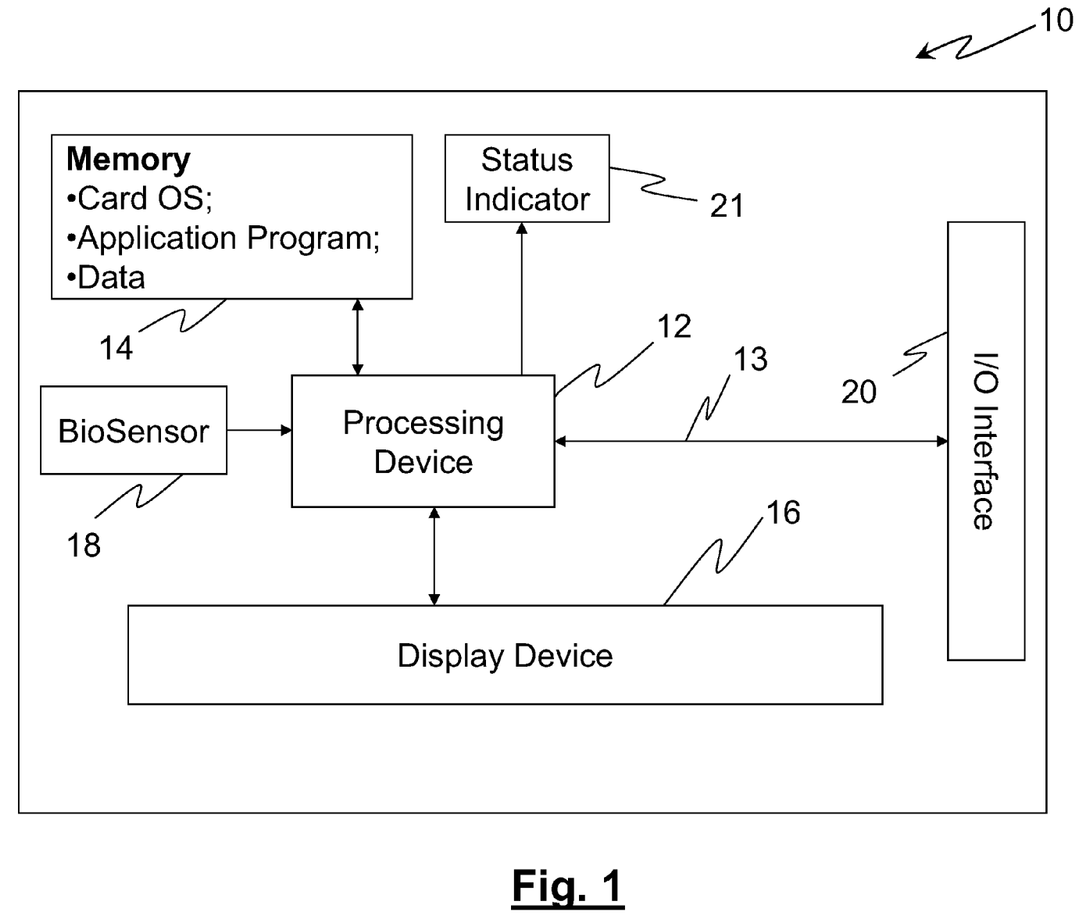
FIG. 1 is a block diagram representation of an apparatus (10) device according to one embodiment of the invention.
Figure 2:
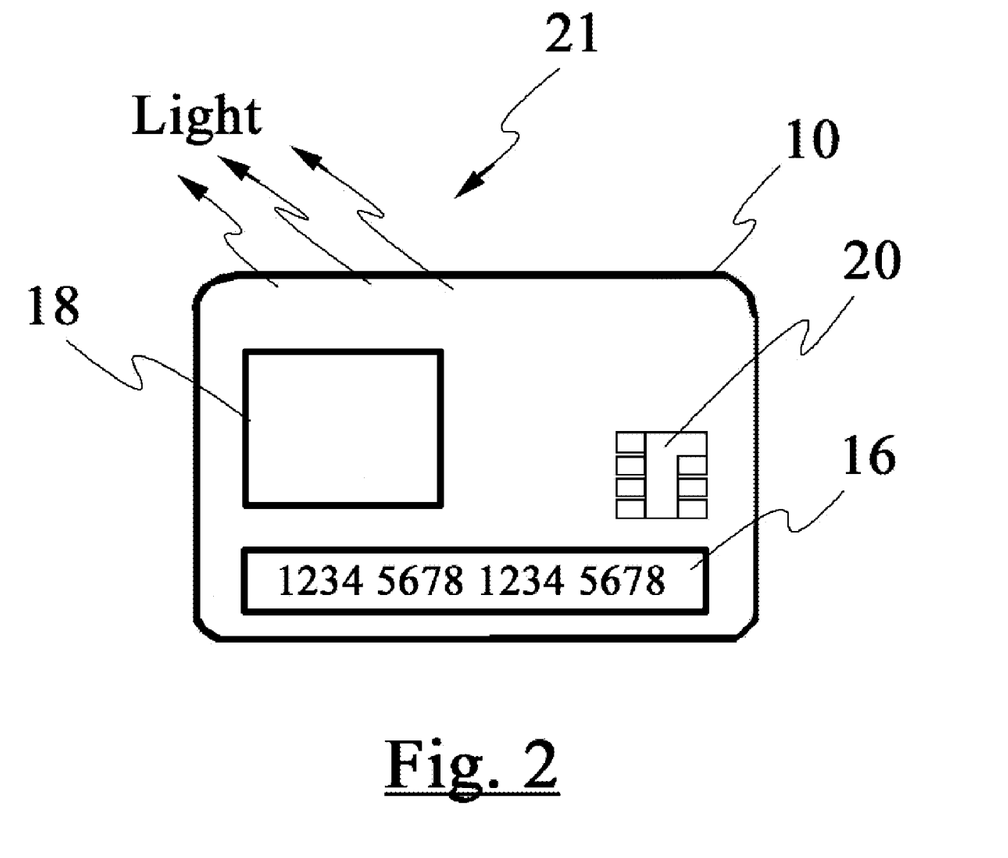
FIG. 2 is a side view of a transaction card according to one possible embodiment of the invention depicting an exemplary card layout.

Referring now to FIG. 1, a block diagram representation of a transaction smart apparatus (10) according to one embodiment of the invention is depicted. For this presently preferred embodiment of the invention, the transaction card comprises processing device 12 electrically associated with at least one nonvolatile memory (14). Memory (14) is configured for storing at least one of the card Operating System (OS), application programs, and data. FIG. 2 is a side view of smart apparatus (10) depicting one possible card layout scheme.

Processing device (12) is further electrically associated with status indicator (21). Status indicator (21) is suitably configured to communicate a card status to a person or device external to transaction smart apparatus (10). One suitable status indicator would be at least one light source use to notify the user of a card status. For example, status indicator (21) may be a set of LEDs configured to emit a different spectrum of light. Alternatively, as shown in FIG. 2, at least a portion of the card cover may be comprised of a light fiber (e.g. 3M™ makes suitable luminance light fibers) that emits a predefined color indicating a card status.

Processing device (12) is further electrically associated with a display device (16). Display (16) is configured for displaying the various smart apparatus (10) data and in particular a "credit card number." For the present embodiment, display (16) is a single segment display configured for displaying a number.

Alternatively, at least a portion of the card body may be configured to provide a display function. For example, the entire surface of smart apparatus (10) may comprise a display configurable to display various images including pictures, data, and status signals. For such embodiment, display (16) may comprise an integral display interface configured for providing communications between processing device (12) and display (16). Such interface may comprise a customizable touch screen controller configured for control and decoding functions for display (16) depending on the smart apparatus (10) application. For such an alternative embodiment, display (16) is a flexible display such as an "electronic paper" display manufactured by Fujitsu. Additionally, display (16) may be configured to provide a display readout when power is removed from the display. For this embodiment, an image is written on the LCD display and when power is removed, the display will retain the image virtually indefinitely or until "erased" by processing device (12). Such a LCD display uses a technique developed by Zenithal Bistable Devices (ZBD), which adds a finely ridged grating to the inner glass surface of an LCD cell of Super-Twist-Nematic (STN) construction. As in known in the art the presence of the grating "latches" the polarization state of the liquid crystals and retains it when power is removed.

Processing device (12) is further electrically associated with I/O interface (20). I/O interface (20) is configured for transferring data from smart apparatus (10) to an external device. I/O interface (20) may be any suitable interface (such as the ones manufactured by National Semiconductor) for its intended purpose and may include support for various ISO protocols such as 7816-3 with host interface protocols such as AMBA 2.0. For this embodiment of the invention, I/O interface (20) includes enabling/disabling interrupts to allow processing device (12) to enable and disable I/O interface (20) when desired. The I/O connection includes a bidirectional serial data signal, a card detect input signal, a Smart Card clock output (SCCLK), output signals for Vcc control, and Smart Card reset output.

Processing device (12) is further electrically associated to biosensor (18). Processing device (12) using biosensor (18) is configured for analyzing biological attributes of a body and generating biodata for authentication purposes. Biodata includes data related to fingerprints, eye retinas and irises, voice patterns, facial patterns and hand measurements. For the presently preferred embodiment, biosensor (18) is a fingerprint scanner that samples at least a portion of a finger tip or other body part thereby providing a biosample (e.g. fingerprints, thumbprints, palm prints, footprints). One suitable method of associating a biosensor with a smartcard is disclosed in U.S. application 20060027905 (Bauer et al., application Ser. No. 11/196,497) and such application is incorporated by this reference for all that it discloses.

Figure 3:
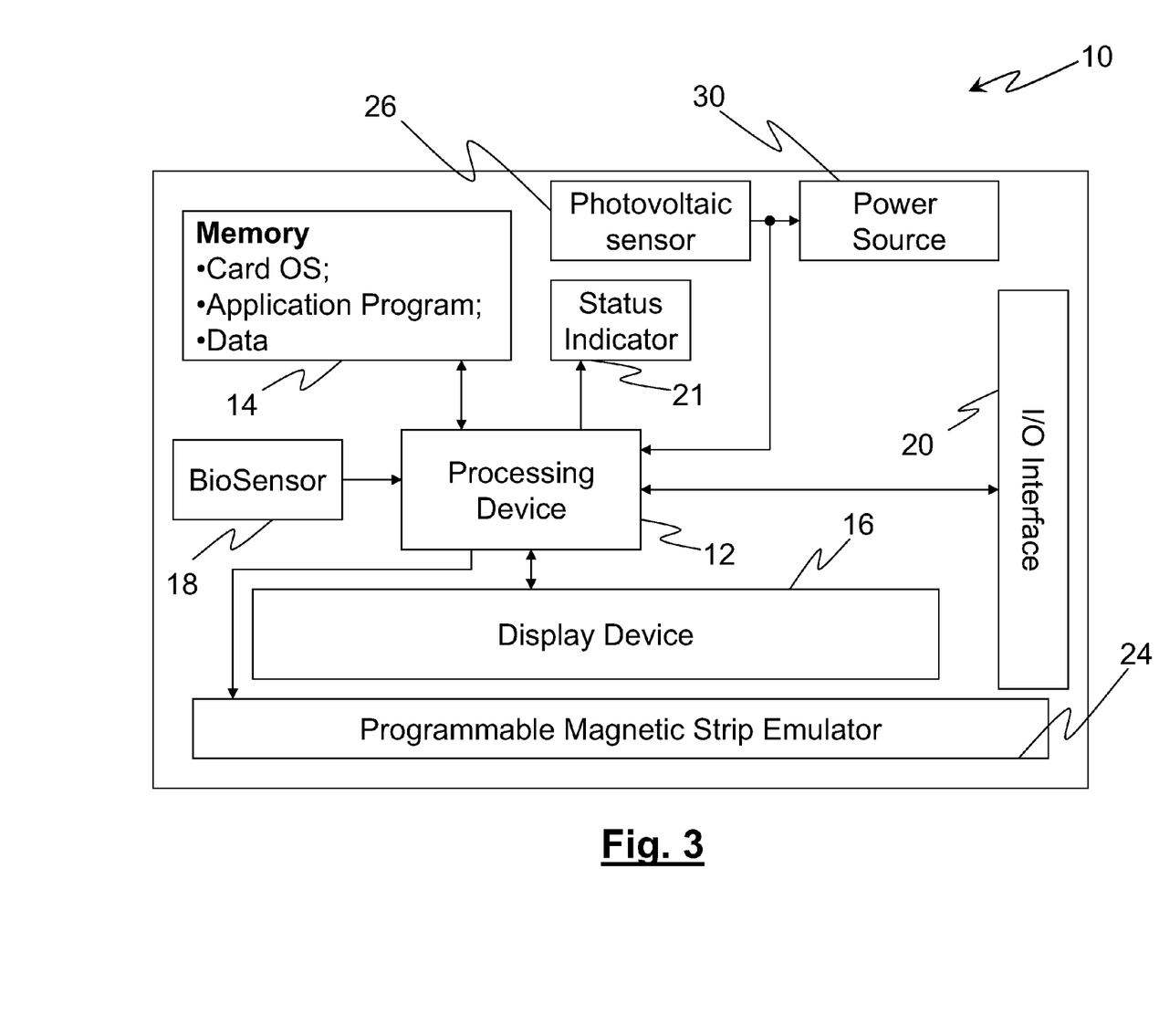
FIG. 3 is a block diagram representation of an apparatus (10) device comprising a programmable magnetic strip according to another embodiment of the invention.

Not shown on smart apparatus (10) is a power source. Any suitable power source may be used. Referring now to FIG. 3, one alternative embodiment of smart apparatus (10) is presented. For such configuration, apparatus (10) includes a photovoltaic sensor (26) electrically associated with power source (30). Photovoltaic sensor (10) is preferably formed from flexible photovoltaic materials such as disclosed in U.S. Pat. No. 6,913,713 (incorporated by the reference for all that it discloses) issued to Chittibabu et al. It should be appreciated that power source (30) may be of any suitable rechargeable storage technology such as rechargeable batteries and capacitors.

For the configuration depicted in FIG. 3, the apparatus further comprises programmable magnetic strip emulator (PMSE) (24). PMSE (24) is a series of magnetic field generators suitably arranged and configured to emulate magnetic strip data. PMSE (24) is preferably disposed about 0.223 inches (5.66 mm) from an edge of the card and is about 0.375 inches (9.52 mm) wide. The magnetic elements of PSME (24) may form any number of tracks of any suitable sizes. For the current embodiment, such magnetic elements form three tracks, with track one and three each being 0.110 inches (2.79 mm) wide and configured for a recording density of about 210 bits per inch (8.27 bits per mm). Track two is configured for a recording density of about 75 bits per inch (2.95 bits per mm). It should be appreciated that any number of tracks configure for any suitable recording density fall within the scope of the present invention. Those of ordinary skill in the art will appreciated that such a configuration will allow apparatus (10) to be read by most point-of-sale hardware.

PMSE (24) is electrically associated with processing device (16). Processing device (16) is suitably configured to activated and deactivate PMSE (24) according to predefined PMSE activation criteria. For example, when card (10) is in its default state, PMSE (24) is not activated and the magnetic elements of PMSE (24) do not contain valid data. However, for some embodiments, PMSE (24) may be programmed with known invalid data stream for counterespionage purposes. For example, a user may be lead to believe that she has succeeded in using an apparatus (10) when in fact the fraudulent transaction was allowed with the invalid data being used for some purpose (such as tracking). When a valid user activates apparatus (10) via bio sensor (18), after user authentication has been performed, processing device (16) activates PMSE (24) and programs PMSE (24) with valid user data.

Figure 4:
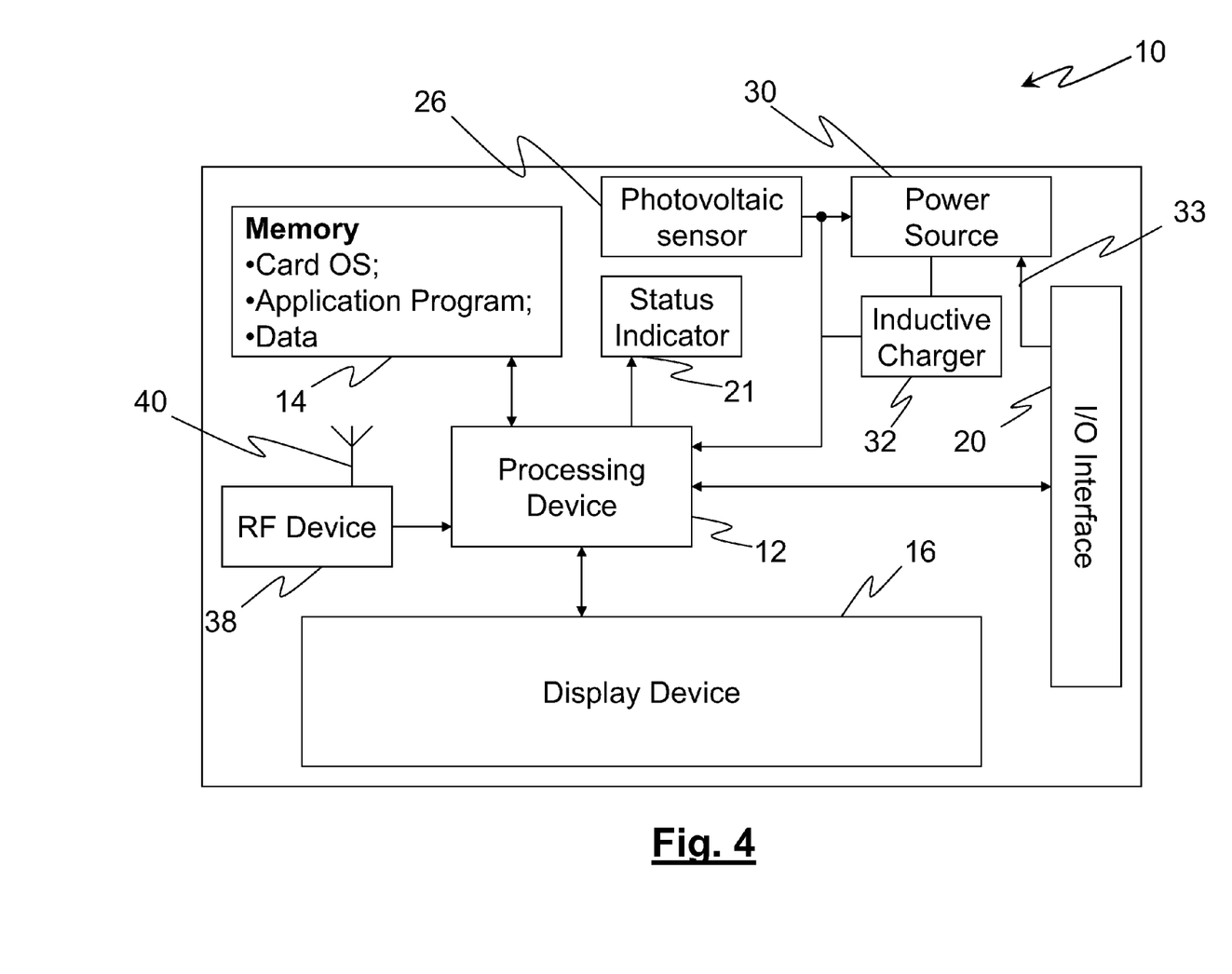
FIG. 4 is a block diagram representation of an apparatus (10) device comprising RF communication features according to yet another embodiment of the invention.

Referring now to FIG. 4, another alternative embodiment of the invention is presented. For the current embodiment, apparatus (10) further includes RF (radio frequency) device (38) electrically associated with antenna (40). It should be appreciated that RF device (38) may be a transmitter, a receiver or a transceiver. For the presently preferred embodiment, RF device (38) is a relatively low power transceiver that operates in an unlicensed band or at a power level that does not require a license. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention.

Figure 5:
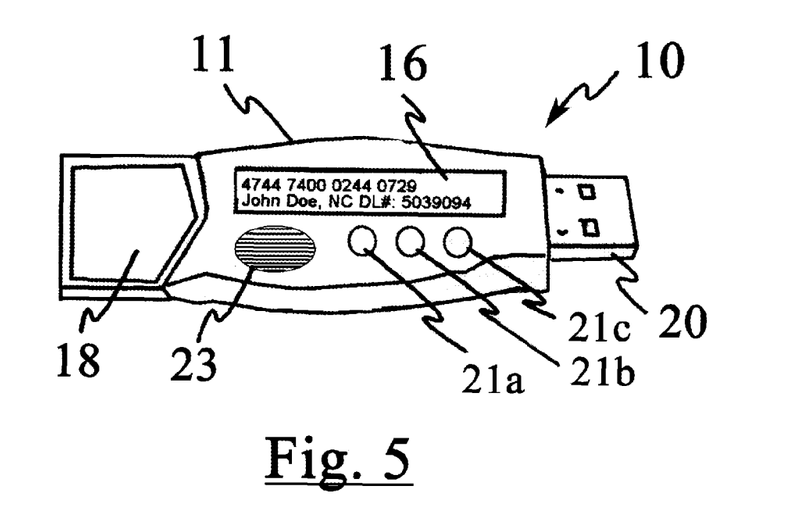
FIG. 5 is a side perspective view of an apparatus (10) device in a "memory stick" configuration defining a communication port, a biosensor, a display and status indicators.

Referring now to FIG. 5, another alternative embodiment of the present invention is presented. For this embodiment, apparatus (10) comprising a housing (11) for housing the previous described apparatus components with I/O interface (20) comprising a port for transferring data between apparatus (10) and an external electronic device. One suitable technology for such interface (20) is a Universal Serial Buss (USB) interface. Biosensor (18) is a finger print scanner configured to sample and transfer biodata to processing device (12). Status indicators (21a, 21b, 21c) are configured to generate a status signal reflective of an apparatus (10) state. For example, status indicator (21a) may be a LED configured to emit a red light, for example, when an invalid biosample is transferred to processing device (12). Audio device (23) is another embodiment of a status indicator that is configured to emit a sound (such as a beep) to represent an apparatus (10) state.

Figure 6:
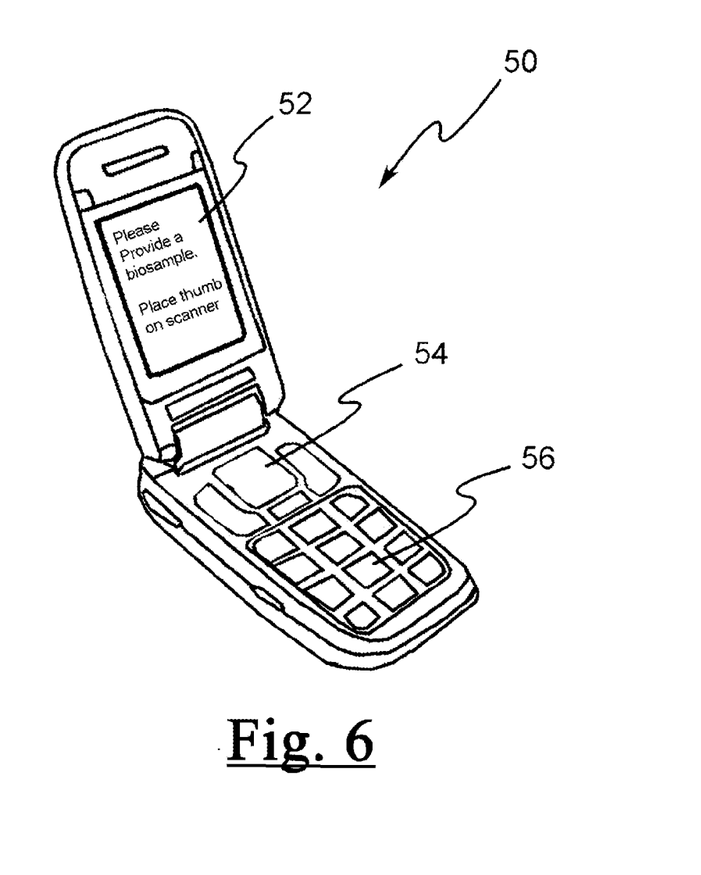
FIG. 6 is a side perspective view of one embodiment of a smart module (50) suitable for being configured as and apparatus (10) clone.

Referring now to FIG. 6, one exemplary external device for cloning apparatus (10) functions is presented. For this embodiment, apparatus (10) is configured to clone its user data by transferring such data to an appropriately configured electronic device such as cell phone (50). Apparatus (10) is configured with a clone routine that is triggered by an appropriately configured clone signal. For this example, cell phone (50) is configured to send a properly formatted clone signal. Cell phone (50) comprises display (52), biosensor (54) and keypad (56). A user initiates a clone request using cell phone (50). Cell phone (50) requests a user biosample. The user provides the appropriate biosample which is converted to biodata that is transferred to apparatus (10). Additionally, a user ID number may be requested and transferred to apparatus (10) along with the biodata. If the user authorization is confirmed, the clone process is initiated and the necessary information is transferred to cell phone (50). After the completion of a successful cloning procedure, the user may make secure transactions using cell phone (50).

Smart Module

Figure 7:
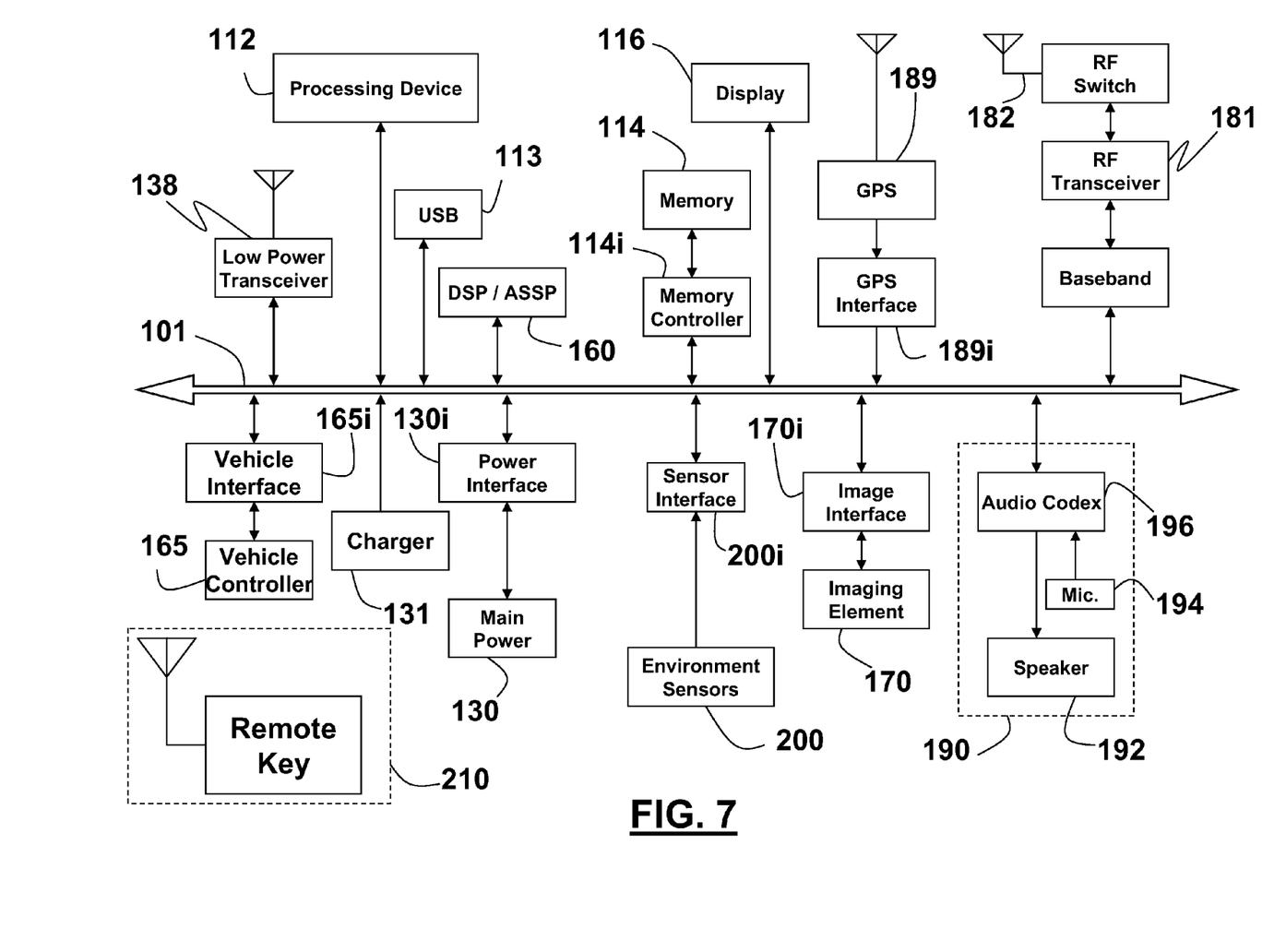
FIG. 7 is a block diagram representation of an smart module (100) according to yet another embodiment of the invention.

Referring now to FIG. 7, attention is now directed to a smart module (100) configured to perform apparatus (10) functions as well as provide a cloning feature for receiving user data from apparatus (10). FIG. 7 depicts one exemplary block diagram representation for one embodiment of an exemplary module (10) device configured for being electrically associated with a vehicle controller. Alternatively, module (10) may be an integral part of the vehicle's systems.

For the presently preferred embodiment of the invention, smart module (100) is configured to communicate with apparatus (10) via a wired or wireless communication connection. For example, apparatus (10) may be a device as depicted in FIG. 5 that is electrically associated with smart module (100) via a USB interface. It will be appreciated that for such a configuration, smart module (100) can be used to perform financial transactions using apparatus (10). Alternatively, apparatus (10) user data and/or processes may be "cloned" from apparatus (10) to smart module (100) (as describe below) so that smart module (100) may be used to make financial transactions without the need for being associated with apparatus (10). It will be appreciated that with such a configuration, payment information (e.g. card number and authorization information) can be transmitted to a remote device to pay for items and services. For example, when at a fast food drive through, a user can activate smart module (100) by supplying the appropriate biosample and make automatic payments through a wireless communication link.

Attention is again directed to FIG. 7 which depicts an exemplary block diagram representation of smart module (100). Initially, it should be appreciated that the functions represented by individual blocks may be performed by ASSPs (Application Specific Standard Product) although one or more blocks may be integrated into ASSP chip sets. Manufactures of such devices include Motorola, and Texas Instruments. In addition, Complex Programmable Logic Devices (CPLD) may be used to interface the various ASSP blocks to system buss (101) allowing one system component to interface with another component. Manufactures of suitable CPLD devices include Lattice's (ispMACH 4000 family) and (Altera's MAX 7000-series CPLD).

Processing device (112) is electrically associated with buss (101) and is configured to perform various tasks including data management, data storage, data transfers, resource monitoring, and system monitoring. For the preferred embodiment, processing device (112) is a microprocessor that supports standard operating systems and application software although other processing devices may be used such as ASICs (application specific integrated circuit) or ASSPs (application specific standard product). Processing device (112) may comprise onboard ROM, RAM, EPROM type memories.

Buss (101) is configured for providing a communication path between the various electronic devices electrically associated with buss (101). Buss (101) may also comprise electrical paths for transferring power between main power (130) and other electronic devices electrically associated with buss (101).

Memory (114) is electrically associated with buss (101) via memory controller (114i). Memory (114) may be any type of memory suitable for storing data such as flash memory, SRAM memory, hard drive memory, as well as other types of memories. Memory (114) may be used for storing all types of data including application programs, image data, sound data, financial transaction data, sensor data, and warning-criteria. Memory (114) is electrically associated with processing device (112) via memory controller (114i) and buss (101).

DSP/ASSP (160) is electrically associated to processing device (112) via buss (101). DSP (160) is configured to perform signal processing tasks such as voice, audio, video, encoding, decoding as well as other data and signal processing functions.

Display (116) is configured for displaying the various smart module (100) data. Display (116) is electrically associated with buss (101) through display interface (116i) which comprises a customizable touch screen controller configured for control and decoding functions for display (116). For the preferred embodiment display (116) is a LCD display configured with touch screen functionally. A graphics accelerator may further be associated with processing device (112) that provides support for megapixel cameras and 3D graphics applications. One suitable graphics accelerator is the MQ2100 manufactured by MediaQ.

Smart module (100) may further comprises communication circuitry (180) comprising a transceiver (181) electrically associated with antenna (182). Communications circuitry (180) is configured to transmit a data signal to a remote electronic device. It should be noted that embodiments where communication circuitry (180) comprises only a transmitter fall within the scope of the invention. For the preferred embodiment, transceiver (180) comprises a relatively low power transmitter that transmits a data signal in an unlicensed frequency although transmitter circuitry (180) may comprise any number of well known technologies for wireless communications transmitting at any legal power level. For example, communication circuitry (180) may be configured to communicate over GPRS, GSM, GPRS, 3G, and EDGE enabled networks as well as WAP networks. Consequently, for some embodiments, communication circuitry (180) may define common cell phone communication technology. It should be appreciated that smart module (100) may further be configured to use communication circuitry (180) to communicate with external networks such as local area network (LAN) and wide are networks (internet).

Low Power transceiver (138) comprises a low power transmitter relative to transceiver (180) and operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. By way of example, the low power transmitter may provide communications with devices such as cell phones and may further be operable to transmit on one or more FM bands to provide communication through a FM radio.

It will be appreciated that the lower power transceiver (138) and RF transceiver (181) may use the same antenna or the system may comprise two antennas. In addition, for some embodiments of the invention, smart module (100) may be configured with one transceiver that performs the functions of lower power transceiver (138) and RF transceiver (181).

For the presently preferred embodiment of the invention, smart module (100) includes a GPS device (189) that is electrically associated with processing device (112) via buss (101) and GSP Interface (189i). GPS (189) is one embodiment of a location-detector electrically associated with a processing device where GPS (189) is configured to generate location-data for the location of electronic smart module (100).

Main power (130) may be the vehicles power supply or an internal power source. When main power (130) is an intern power source, such power source is preferably electrically associated with the vehicle's power supply to keep main power (130) charged. For the preferred embodiment, main power (130) is integral to smart module (100) allowing smart module (100) to operate independently from the vehicles power source. For embodiments where smart module (100) may be disassociated from the vehicle for mobile use or use in a different vehicle, charger (131) may be used to power smart module (100) and or keep main power (130) charged.

Smart module (100) is further configured for being electrically associated with a vehicle controller, such as vehicle controller (165). Vehicle controller (165) is electrically associated with processing device (112) via vehicle interface (165i) and buss (101). A vehicle controller is simply an electronic system configured to control various vehicle system which may include any of the following: cruise control, start vehicle, turn off vehicle, climate control, window control, lights control, horn control, and communications. Such control systems are well known in the art.

Imaging element (170) is electrically associated with processing device (112) through image interface (170i) and buss (101). Imaging element (170) and image interface (170i) are configured for acquiring and transmitting images to electronic devices electrically associated with buss (101), via communication circuitry (180), and/or low power transceiver (138). For the preferred embodiment, imaging interface (170i) is configured to support CMOS image input sensors such as the one manufactured by Micron® and/or CCD (charge-coupled device) image input sensors such as the ones manufactured by ATMEL® sensors. Imaging interface (170i) performs the necessary processing functions to convert the imaging data into a desired format before transferring such data to other devices associated with buss (101). Imaging element (170) may be used, for example, to generate biodata and/or images of the inside/outside of the vehicle.

For the preferred embodiment, audio module (190) comprises speaker (192) and microphone (194) electrically associated with audio codex (196). Audio module (190) is configured for detecting sound waves and converting such waves into digital data of a predefined format such as MP3. Sound waves may also be generated by audio module (190) using speaker (192) to issue warnings and provide for other forms of communications. It should be appreciated by those of ordinary skill in the art that microphone (192) may be used to provide a biosample to processing device (112).

Environment sensor (200) represents one or more sensors electrically associated with processing device (112) via sensor interface (200i) and buss (101). Generally speaking, a sensor is a device that tells something about its environment typically using a transducer which converts a parameter at a test point to a form suitable for measurement by a sensor circuit. Stated another way, a sensor is a device which is designed to produce a signal or offer an indication in response to an event or stimulus within its detection zone. An electronic sensor is a sensor that provides such information by creating an electrical signal. Sensor technologies are known and understood by those skilled in the art, and a detailed explanation thereof is not necessary for purposes of describing the method and system according to the present invention.

Sensor (200) may include: (a) carbon monoxide sensors, (b) smoke sensors, (c) a temperature sensors, (d) outside wind speed, (e) light, (f) sound, (g) door open/closed, (h) window down/up, (j) lights on sensor, (k) power supply status sensor. Sensor interface (200i) may be a CPLD configured to periodically scan (at random intervals, periodic intervals, or user defined intervals) the various sensors electrically associated with interface (200i) and transfer processed or unprocessed sensor signals to devices electrically associated with buss (101) (such as processing device (112)).

Remote door keys for unlocking vehicles are well known in the art. However, for the present inventions, apparatus (10) is configured to communication with smart module (100) to provide a secure remote key feature for unlocking a vehicle. For this embodiment of the invention, a user supplies a bio-sample to apparatus (10). When apparatus (10) verifies the intended user is an authorized user, functions keys associated with apparatus (10) are made active. The user then activates the appropriate function key to perform a desired activity such as unlocking a door. Once an active function key is pressed, apparatus (10) activates the appropriate circuitry and initiates the appropriate process(es) to achieve a predefined function. It should be appreciated that such functions are not depicted in the drawings.

Methods

In addition to the methods disclose above, exemplary methodologies for using the above described technologies are now considered in more detail.

One exemplary embodiment of apparatus (10) relates to novel implementations of electronic technology incorporated into a transaction card having a dynamic number. For such embodiments of the invention, the transaction card is about the size of a traditional credit card. The memory is configured for storing a card operating system, application programs, and data. The data stored in the memory includes a numerical representation for a stored bio-sample. The stored bio-sample is the enrolment bio-sample of a user. An enrolment bio-sample is a bio-sample provided by an authorized user when the card is first put in use. The enrolment bio-sample is used in present and future comparisons with real time bio-samples to verify the identity of a desired user.

Figure 8:
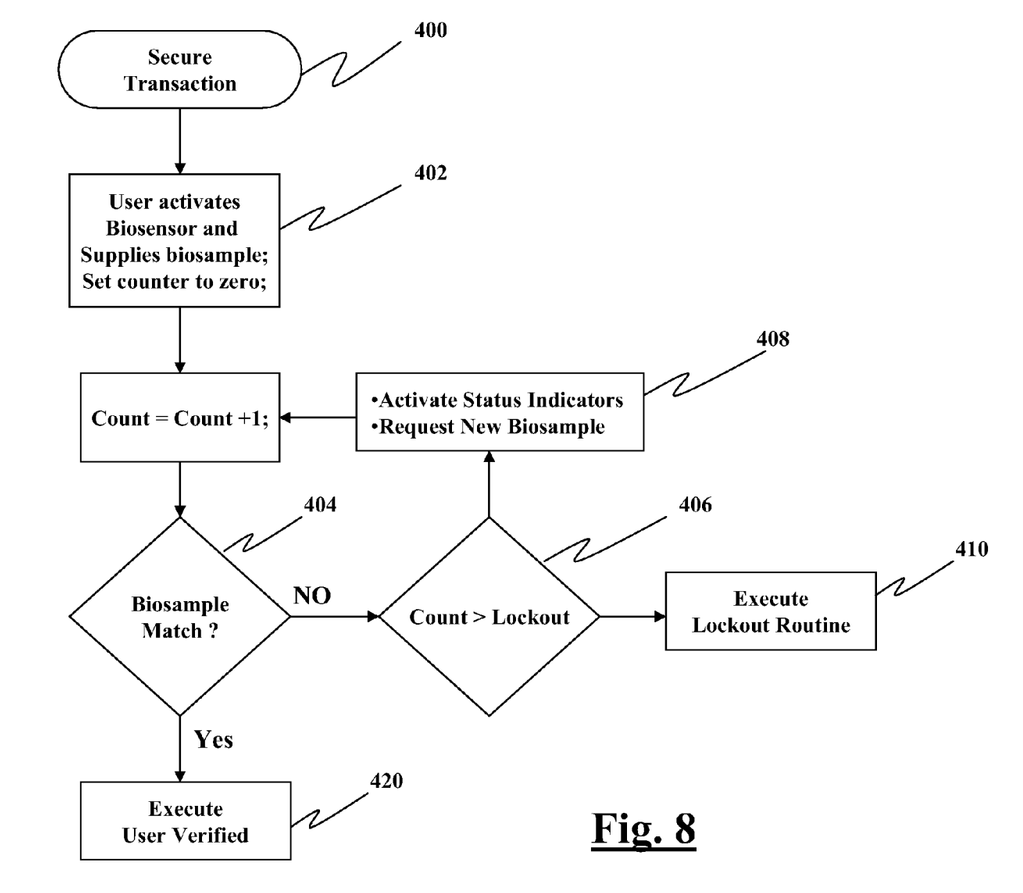
FIG. 8 is a flow chart representation of a portion of a secure transaction process.

One exemplary method of using apparatus (10) is presented in flow chart presented in FIG. 8. It should be appreciated that all enrolment biosamples have been previously stored in memory. Processing device (12) is configured to selectively activate display (16) and display a valid card number (static or dynamic) only after processing device (12) authorizes a transaction. For the present embodiment of the inventions, the default configuration of display (16) is set to not display a valid card number. Display (16) may be active and displaying other information, but not a valid card number.

Referring now to FIG. 8, the exemplary Secure Transaction (400) routine begins at step (402) where a user activates the ID process by activating biosensor (18). For example, biosensor (18) may be activated by simply touching the biosensor for a fingerprint sensor. House keeping routines are executed as needed such as setting a count variable to a predefined number. At step (404) a digital representation of the received biosample is compared to the enrolment biosample. If there is a match, an exemplary User Verified (420) is executed. If the biosamples do not match, the variable count is compared to a predefined variable "lockout". The lockout variable value sets the number of times an invalid biosample can be submitted before the exemplary Lockout Routine (410) is executed. If count is less than lockout, a new biosample is requested at step (408). If count is greater than lockout, exemplary routine (410) is executed.

Once a user is verified, user verified (420) routine is executed. For embodiments using a dynamic card number, processing device (12) activates the dynamic cared generating process. One prior art method of generate a dynamic card number is disclosed in U.S. Pat. Nos. 4,720,860; 4,856,062; 4,885,778 issued to Weiss and such references are incorporated by this reference for all that they disclose. For one exemplary dynamic number generation routine, processing device (12) is further configured to calculate a dynamic card number using a constant value and a dynamic value.

The calculated dynamic card number is preferably only valid for a predetermined period of time. If the dynamic number last generated by processing device (12) is no longer valid when User Verified (420) routine is executed, processing device (12) calculates a new dynamic number. The valid dynamic card number is then transferred to the display (16) device for predefined display-period.

In addition, for embodiments comprising a PMSE (24) device, processing device (12) programs PMSE (24) when predefined user data such as: name, address, ID number, dynamic card number and/or other data normally associated with a traditional magnetic strip credit card.

Even further, for apparatus (10) embodiments comprising a transmitter, the above described transaction information (dynamic/static card number, user information, etc.) may be transmitter to a remote device using an RF signal.

It should be noted that at step (408) the status indicators are activated to signal an apparatus (10) status. At step (408), for example, status indicators (21) may be a light source that emit(s) a predefined spectrum of light (such as red). For embodiments where at least a portion of the card is composed of light fibers, that portion of the card turns a predefined color to signal a card status (to the user and others viewing the card). In addition, an audio signal, such as a beep, may be generated. Similarly, User Verified (420) routine may activate status indicators (21) to signal a card status.

In addition to transferring transaction related data to a remote device, apparatus (10) may further be configured to generate and transfer system-status data. Here, processing device (12) monitors and checks various system components and generated system-status-data. System-status-data may include: battery status, clock status, and card diagnostic data.

Cloning Features

The term "cloning" as used in this document refers to the process of transferring apparatus (10) data and/or functions to a properly configured remote device such as a cell phone, a PDA and smart modules. Such devices are generally referred to as "authorized clones". Through cloning, an apparatus (10) supplier (e.g. bank, employer, etc.) may issue an apparatus (10) to a user and the user may then clone the functionality of apparatus (10) to a properly configured and authorized electronic device.

For the presented embodiment of the invention, apparatus (10) is configured with a cloning routine. The cloning routine may be activated in at least one of two ways including: (A) Processing device (12) is configured "listen" for a clone-request-signal; and (B) apparatus (10) may comprise a clone request feature activated by a user control (such as a button).

For clone routine activation method (A), processing device (12) is configured to listen for a predefined clone-request-signal. Such clone-request-signal has a predefined confidential signal and or data format. The predefined confidential signal/data format may be an encoded or unencoded signal transmitted at a particular frequency and/or in a predefined data pattern. When a properly formatted clone-request-signal is detected, processing device (12) executes the cloning routine.

For the clone routine activation method (B), apparatus (10) comprises a clone activation means such as a button. A user initiates the clone routine via the clone activation means.

Once initiated, the Clone Routine first requests a user biosample. As describe above, the user biosample is compared to an enrollment biosample, and if there is a match, the clone routine continues to the next step where apparatus (10) verifies the external device is an authorized clone. An authorized clone is a device that has been deemed to comply with the security requirements of a user, the apparatus (10) manufacturer, the apparatus (10) issuer or some other authoritative entity. One method of defining an "authorized clone" is to program such device with a clone-security-code (a code that is also programmed into apparatus (10)). The device may be programmed with the clone-security-code by a user. Apparatus (10) request the clone-security-code from the device and if the clone-security-code is valid, the cloning process begins.

During the cloning process, user data is transferred from apparatus (10) to the device. Such user data may include: user name, user address, user phone number, user social security number, user account number, user pin number as well as other data. In addition, data necessary for running various software routines may be transferred. For example, for embodiments were apparatus (10) generates a dynamic number, the data and/or routines required to generate such dynamic number are transferred. It should be appreciated that after a successful cloning procedure, a user may use the "clone" to perform the secure transactions previously performed by apparatus (10).

It should be appreciated that apparatus (10) may be configured to perform a variety of secure transactions. The cloning routine may be configured to transfer data related to all such secure transactions or subset. For the preferred embodiment, a clone device may not clone another device, only apparatus (10) may perform the cloning function. Consequently, for such embodiment, a clone does not include the cloning routine.

Smart Module Features

Smart module (100) is one exemplary embodiment of a smart module. As previously noted, smart module (100) is configured for being associated with a vehicle. For the present exemplary embodiment, smart module (100) is configured to be associated with a passenger vehicle. Smart module (100) is preferably configured as authorized clone to perform secure transaction, however, smart module (100) may simply be electrically associated with apparatus via a wired connection (e.g. USB interface (113)) or via a wireless connection (Transceiver (138)). With such a configuration, smart module (100) can be used to perform secure transactions such as ordering merchandise (e.g. food).

One method of ordering "fast food" using smart module (100) is now considered. Initially, a user selects an eating establishment (preferably one with a drive through) and generates a request for service. The user may read a menu data at the establishments drive through location, access a menu data from a remote network (internet), or receive a menu data transmission transmitted by the establishment.

When the menu data comes from a remote network such as the internet, module (100) communicates with the establishment via the internet. Module (100) access the establishment's services website which is displayed on display (116). The user makes the desired selections using touch screen technology or a keypad and module (100) moves the selected items to a "shopping cart." When finished, the user takes the appropriate action to end the shopping and the contents of the "shopping cart" are totaled and the establishment generates a request for payment. Module (100) transfers such request for payment to the user (e.g. via display 116) and the user authorizes payment by providing a biosample.

It should be appreciated that often time when an order is placed over the internet as describe above, the user will be in transit or will soon be in transit to the service/item provider location. Consequently, smart module (100) may further access GPS (189) and transfer location data to the establishment so that an estimated time of arrival (ETA) value can be generated. Alternatively, module (100) may generate an ETA value and transfer that value to the establishment.

When the menu data comes from a data signal transmitted by the establishment, such data signal is displayed on display (116). The user makes the desired selections using touch screen technology or a keypad and module (100) moves the selected items to a "shopping cart." When finished, the user takes the appropriate action to end the shopping and the contents of the "shopping cart" are totaled the establishment generates a request for payment. Module (100) transfers such request for payment to the user (e.g. via display 116) and the user authorizes payment by providing a biosample.

Alternatively, the user uses the traditional speaker system to order the establishments services, the user verbally orders the desired items and the establishment generates and transmits a request for payment. Module (100) transfers such request for payment to the user (e.g. via display 116) and the user authorizes payment by providing a biosample.

Another important feature that may be provided by module (100) relates to user safety. One exemplary safety feature relates to improved safety for infants. It seems that every year one hears of a parent that forgets a baby in the back seat of a car and the baby dies from exposure before the parent realizes what has happened. Module (100) can be configured to greatly reduce the possibility of such an event by including an Infant Safety Routine.

For this embodiment, a voice sample of a particular infant crying is taken using audio device (190) and stored in memory. Alternatively, a standardized voice sample of an infant crying may be used. When the vehicle is parked, module (100) is configured to monitor the vehicles inside environment for sound. If sounds detected substantially match the voice sample of the infant crying, smart module (100) performs a Save-Baby Routine.

One exemplary Save-Baby routine includes the step of generating a baby-crying detection signal whenever sounds are detected that substantially match the voice sample of an infant crying, are detected. Next, a timer or counter is activated and tracks time as long as the baby-crying detection signal is being generated. When the timer/counter reaches a predefined value, a forgotten-baby signal is generated. Once activated, the timer/counter and forgotten-baby signal may be deactivated by a deactivate forgotten-baby signal generated by a user.

Upon generation of a forgotten-baby signal, module (100) may be programmed to perform a variety of tasks. First, module (100) attempts to contact one or more users using predefined contact criteria such as phone numbers and e-mails addresses. Module (100) may use audio module (190) to record real time sound data to be transferred to a user. In addition module may be further configured to use Imaging element (170) to take images of the cars inside and out side environments and transfer such images to a user. Smart module (100) may further access GPS (189) to retrieve location data and transfers such data to a user.

Smart Module (100) may be configured to monitor the baby's environment and take further steps to protect the baby including the following:

(1) If the temperature inside the vehicle is determined to be outside a predefined temperature range, smart module (100) starts the vehicle's engine and activates the vehicle's climate control system to maintain a predefined climate setting.

(2) Smart monitor (100) monitors the CO2 levels inside the vehicle and if the CO2 level exceeds a predefined value, the vehicle's engine is shutoff and at least one window is "rolled down" to ventilate the car. When the CO2 levels return to a predefined acceptable level, the window(s) may be rolled back up and the care started as before to maintain an acceptable climate.

(3) When the timer/counter reaches a second predefined call-911 value, module (100) contacts 911 and transmits an automatic message that may include any of the information described above, including the location data for the vehicle.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A smart device having a dynamic number, said smart device comprising:

a housing, said housing comprising a first surface and an opposing second surface;

a processing device disposed between said first surface and said second surface and operatively associated with at least one memory, wherein said at least one memory is configured for storing at least one of an operating system, an application program, and data;

wherein said data includes a numerical representation for a stored bio-sample, said stored bio-sample representing the enrolment bio-sample for a device-owner;

a display device configured for displaying information, said display device operatively associated with said processing device;

a receiver operatively associated with the processing device and configured for receiving data from an external device;

a power source electrically associated with the processing device, memory, display device, and receiver;

wherein said receiver is configured to receive a data signal from an external device associated with a biosensor associated with a card user, said data signal comprising a numerical representation of a real time bio-sample of said user;

wherein the processing device is configured compare one of the processed and unprocessed data signal to the digital representation of the stored bio-sample and generate security data based on the comparison;

wherein said security data comprises one of an ID valid flag and an ID invalid flag, wherein a ID valid flag is generated when the numerical representations of the two bio-samples are determined to be equivalent and wherein an ID invalid flag is generated when the numerical representations of the two bio-samples are determined not to be equivalent;

wherein said processing device is further configured to calculate a dynamic number using a constant value and a dynamic value when an ID valid flag is generated;

wherein the dynamic number is valid for a predetermined period of time; and wherein said display device is activated to display the generated dynamic number for at least part of said predetermined period of time.

2. A smart device having a dynamic number as in claim 1, wherein said processing device is configured to activate a cloning routine upon at least one of (a) user request, and (b) receiving a clone request from an external device.

3. A smart device having a dynamic number as in claim 1, further comprising a bio-scanner electrically associated with said processing device and said power source, said bio-scanner configured to sample a user biological attribute.

4. A smart device having a dynamic number as in claim 3, further comprising a status indicator configured to generate a status signal reflective of a card state.

5. A smart device having a dynamic number as in claim 4, wherein said status indicator is one of (a) an light source, and (b) a sound generator.

6. A smart device having a dynamic number as in claim 4, wherein at least a portion of at least one of said first surface and said second surface is composed of a light fiber associated with said processing device, said light fiber defining said light source.

7. A smart device for making secured transactions, said smart device comprising:
a housing comprising a first surface and an opposing second surface;
a processing device disposed between said first surface and said second surface, said processing device electrically associated with at least one of (a) onboard memory and (b) external memory disposed between said first surface and said second surface;
wherein said memory is configured to store smart device owner information;
a communication circuit at least partially disposed between said first surface and said second surface and electrically associated with said processing device and configured for transferring information;
a power circuit electrically associated with said processing device, said memory and said communication circuit, wherein said power circuit is at least one of (a) electrically associated with a power source disposed within said housing, and (b) configured for being inductively coupled to a power source external to said housing; and
wherein said processing device is configured to activate a cloning routine upon receiving a clone request over said communication circuit and wherein said cloning routine comprises transferring at least part of said smart device owner information to an external device.

8. A smart device for making secured transactions as in claim 7, wherein said memory is configured to store at least one enrolment bio-sample for at least one smart device owner and wherein said smart device further comprising a biosensor electrically associated with said processing device and configured to sample a user biological attribute to generate a real-time bio-sample and wherein said processing device is further configured to compare said real-time bio-sample with said at least one enrolment bio-sample before activating said cloning routine.

9. A smart device for making secured transactions as in claim 7, wherein at least a portion of at least one of said first surface and said second surface is composed of a light fiber defining an visual-generator, said visual-generator associated with said processing device.

10. A smart device for making secured transactions as in claim 9, wherein said processing device is at least one of: (a) configured to request a real-time bio-sample and compare said real-time bio-sample to an enrolment biosample stored in said memory when a clone request is received, and (b) configured to compare a real-time bio-sample received with a clone request to an enrolment biosample stored in said memory before transferring cloning data.

11. A smart device for making secured transactions as in claim 10, wherein said processing device is configured to use said visual-generator to generate a status signal to indicate the result of a real-time bio-sample and enrolment bio-sample comparison.

12. A smart device for making secured transactions as in claim 10, further comprising a sound-generator electrically associated with said processing device and wherein said processing device is configured to use said sound-generator to generate a status signal to indicate the result of a real-time bio-sample and enrolment bio-sample comparison.

13. A smart device for making secured transactions as in claim 7, wherein one of said first surface and said second surface defines a display, said display electrically associated with said processing device, said display configured to display at least one of: (a) a user photo, (b) a card number, and (c) a background image.

14. A smart device for making secured transactions as in claim 7, further comprising a programmable magnetic strip emulator (PMSE) electrically associated with said processing device, said processing device configured to activate and deactivated said PMSE according to predefined PMSE activation criteria.

15. A smart device for making secured transactions as in claim 14, wherein said PMSE comprises magnetic elements that form three tracks, each track being about 0.110 inches wide and configured for a storage density of about 210 bits per inch.

16. A smart device for making secure financial transactions, said smart device comprising:
a housing;
a processing device disposed within said housing, said processing device, electrically associated with at least one of (a) onboard memory and (b) external memory, wherein said memory is configured for storing at least one of an operating system, an application program, and data;

wherein said data includes authorized user-data comprising a number and at least one enrolment bio-sample for at least one authorized user;

a bio-sensor mechanically associated with said housing and electrically associated with said processing device, said bio-sensor configured to sample a user biological attribute to generate a real-time bio-sample;

a communication circuit at least partially disposed within said housing and electrically associated with said processing device and configured for transferring information between said processing device and an external device;

a power circuit electrically associated with said processing device, said memory, said bio-sensor and said communication circuit, wherein said power circuit is at least one of (a) electrically associated with a power source disposed within said housing, and (b) configured for being inductively coupled to a power source external to said housing; and wherein said processor is configured to transfer transaction-data to said external device using said communication circuit when a user provides a real-time bio-sample that matches the enrolment bio-sample for an authorized user.

17. A smart device for making secure financial transactions as in claim 16, wherein said external device is a control module of a vehicle and wherein the secured transaction is a purchase and wherein said transaction-data is transferred by said control module so that the control module can authorize said purchase by transferring at least part of said transaction-data to a device external to said vehicle.

18. A smart device for making secure financial transactions as in claim 17, wherein said transaction-data comprises data used by said control module required to activate said vehicle.

19. A smart device for making secure financial transactions as in claim 16, wherein said communication circuit is configured for being electrically associated with an vehicle-control-module configured for securing a vehicle, wherein said transaction-data comprising a code for at least one of (a) enabling said vehicle, (b) unlocking said vehicle, (c) starting said vehicle, and (d) making a purchase via the vehicle-control-module, said processing device further configured to transfer said transaction-data to said vehicle-control-module via said communication circuit.

20. A smart device for making secure financial transactions as in claim 19, wherein said communication circuit is configured for being electrically associated with a control-module associated with a barrier configured for allowing an preventing access to a secured area, said transaction-data comprising a barrier-code configured to cause said control-module to remove said barrier, said processing device further configured to transfer said transaction-data to said control-module via said communication circuit.

* * * * *